(12) United States Patent
Koch

(10) Patent No.: US 9,037,384 B2
(45) Date of Patent: May 19, 2015

(54) METHOD FOR OPERATING AN INTERNAL COMBUSTION ENGINE, AND INTERNAL COMBUSTION ENGINE

(75) Inventor: Achim Koch, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 211 days.

(21) Appl. No.: 13/699,781

(22) PCT Filed: Apr. 28, 2011

(86) PCT No.: PCT/EP2011/056697
§ 371 (c)(1),
(2), (4) Date: Nov. 26, 2012

(87) PCT Pub. No.: WO2011/147657
PCT Pub. Date: Dec. 1, 2011

(65) Prior Publication Data
US 2013/0073187 A1    Mar. 21, 2013

(30) Foreign Application Priority Data
May 25, 2010    (DE) .......................... 10 2010 021 449

(51) Int. Cl.
*F02B 37/22*    (2006.01)
*F02D 43/04*    (2006.01)
(Continued)

(52) U.S. Cl.
CPC .......... *F02B 37/225* (2013.01); *F02D 41/0007* (2013.01); *F02D 41/0087* (2013.01);
(Continued)

(58) Field of Classification Search
CPC .. F02B 37/225; F02B 27/0284; F02B 29/083; F02B 1/04; F02D 41/0007; F02D 43/04; F02D 2200/0406; F02D 9/00; F02D 9/02; F02D 41/187

USPC ............ 60/601, 611, 600, 602, 605.1, 605.2; 123/198 DB, 462, 493, 559.1, 564; 701/104

See application file for complete search history.

(56) References Cited

U.S. PATENT DOCUMENTS 4,233,814 A * 11/1980 Thore ............................ 60/601
4,375,748 A    3/1983 Yamane
(Continued)

FOREIGN PATENT DOCUMENTS

CN    1609429 A    4/2005
CN    101592070 A    12/2009
(Continued)

*Primary Examiner* — Thomas Moulis
*Assistant Examiner* — Elizabeth Hadley
(74) *Attorney, Agent, or Firm* — Laurence A. Greenberg; Werner H. Stemer; Ralph E. Locher

(57) ABSTRACT

A method for operating an internal combustion engine, having an exhaust gas turbocharger, during a load change of the internal combustion engine, includes initiation of a closing process of a throttle valve of the internal combustion engine, disposed in an induction tract or intake section of the internal combustion engine, as a function of an air pressure which is present upstream of the throttle valve, in such a way that the air pressure always falls short of a surge limit or pumping limit of a compressor, disposed in the induction tract, of the exhaust gas turbocharger. A staged or stepped reduction in a torque of the internal combustion engine is performed by shutting off fuel injections at predetermined cylinders of the internal combustion engine. An internal combustion engine with an exhaust gas turbocharger is also provided.

19 Claims, 2 Drawing Sheets

(51) Int. Cl.
  *F02D 41/00* (2006.01)
  *F02D 41/12* (2006.01)
(52) U.S. Cl.
  CPC ........ *F02D41/123* (2013.01); *F02D 2200/024* (2013.01); *F02D 2200/0406* (2013.01); *Y02T 10/144* (2013.01); *F02D 43/04* (2013.01)

(56) References Cited

U.S. PATENT DOCUMENTS

| | | | |
|---|---|---|---|
| 6,009,710 A | | 1/2000 | Kienle et al. |
| 6,408,625 B1 | | 6/2002 | Woon et al. |
| 6,877,481 B2 | * | 4/2005 | Fahringer et al. ........ 123/339.16 |
| 6,945,047 B2 | | 9/2005 | Shea et al. |
| 6,981,375 B2 | | 1/2006 | Sisken et al. |
| 7,032,382 B2 | * | 4/2006 | Onodera et al. ................. 60/606 |
| 7,296,561 B2 | * | 11/2007 | Shirakawa et al. ........... 123/493 |
| 7,487,639 B2 | | 2/2009 | Hofstetter |
| 8,161,744 B2 | * | 4/2012 | Winsor et al. .................. 60/605.1 |
| 8,161,746 B2 | * | 4/2012 | Ulrey et al. .................... 60/605.1 |
| 8,272,215 B2 | | 9/2012 | Shu et al. |
| 8,393,852 B2 | | 3/2013 | Kaufmann et al. |
| 8,783,031 B2 | * | 7/2014 | Ulrey et al. ...................... 60/611 |
| 2003/0024503 A1 | | 2/2003 | Fahringer et al. |
| 2005/0133006 A1 | * | 6/2005 | Frenz et al. .................... 123/399 |
| 2005/0257520 A1 | | 11/2005 | Fischle et al. |
| 2006/0137660 A1 | * | 6/2006 | Shirakawa et al. ........... 123/493 |
| 2007/0137199 A1 | * | 6/2007 | Magner et al. .................. 60/602 |
| 2009/0198432 A1 | * | 8/2009 | Tabata et al. .................. 701/103 |
| 2009/0301451 A1 | * | 12/2009 | Ito .................................. 123/674 |
| 2010/0135773 A1 | | 6/2010 | Kaufmann et al. |
| 2014/0172219 A1 | * | 6/2014 | Nakanishi et al. ............... 701/22 |

FOREIGN PATENT DOCUMENTS

| | | |
|---|---|---|
| CN | 101657621 A | 2/2010 |
| DE | 4434607 A1 | 4/1996 |
| DE | 10134543 A1 | 2/2003 |
| DE | 10237416 A1 | 2/2004 |
| DE | 102004041166 A1 | 4/2005 |
| DE | 102005054525 A1 | 5/2007 |
| DE | 102007017823 A1 | 10/2008 |
| DE | 102008015855 A1 | 10/2009 |
| EP | 1008739 A1 | 6/2000 |
| EP | 1022450 A2 | 7/2000 |
| EP | 1281851 A2 | 2/2003 |
| GB | 2076467 A | 12/1981 |
| JP | 9287505 A | 11/1997 |

* cited by examiner

METHOD FOR OPERATING AN INTERNAL COMBUSTION ENGINE, AND INTERNAL COMBUSTION ENGINE

BACKGROUND OF THE INVENTION

FIELD OF THE INVENTION

The present invention relates to a method for operating an internal combustion engine and to an internal combustion engine, especially for a motor vehicle.

DE 10 2004 041 166 A1 describes a construction of a turbocharger which basically comprises a radial turbine and a radial compressor which is arranged in the induction tract of an internal combustion engine and is coupled in a rotation-resistant manner to the turbine wheel via a turbocharger shaft. During operation, the exhaust gas flow, which has high kinetic and thermal energy, drives the turbine wheel which, via the coupling to the turbocharger shaft, sets the impeller in rotation. The radial compressor inducts air and compresses this, as a result of which a correspondingly greater mass of fresh air, and consequently more oxygen, are made available in the induction tract of the internal combustion engine than in the case of a conventional normally aspirated engine. As a result, the mean pressure of the engine, and therefore the engine torque, are increased, which leads to a higher power output of the internal combustion engine.

Radial compressors of turbochargers typically have a limited useful operative range with regard to mass flow and pressure ratio. When an exhaust gas turbocharger is in use, occasional operating states occur during engine operation which lie outside the predetermined range of operating characteristics of the radial compressor. Operation with small mass flows and high pressure ratios through the radial compressor, e.g. during the fuel cut-off overrun of the internal combustion engine, is particularly undesirable on account of so-called compressor surging. With a high air mass flow through the compressor, for example as a result of a high engine speed, a high turbocharger speed and a greater charge-air mass flow into the air manifold of the internal combustion engine, which is associated therewith, are established. If the throttle valve of the internal combustion engine is closed quickly from such an operating state, for example during the fuel cut-off overrun, then the air mass flow which flows from the air manifold reduces very quickly. On account of the inertia of the rotating parts of the exhaust gas turbocharger, a pressure increase occurs in the air manifold as charge-air mass flow reduces. In this case, the flow can break away from the compressor blades and the air through the compressor can backflow which allows the pressure to drop. Since the speed of the impeller is adapted only slowly to the reduced charge air demand on account of the high rotational energy, the flow direction is reversed again after establishing corresponding pressure ratios through the compressor. The process is repeated in rapid succession and is referred to as compressor surging on account of the characteristic noise which develops in the process. As a result of this compressor surging, the thrust bearings and the impeller of the turbocharger are loaded to an excessively high degree. This can reduce the service life of the turbocharger.

In order to prevent compressor surging, so-called overrun air recirculation valves are used, for example. A turbocharger arrangement with such an overrun air recirculation valve is described in DE 10 2005 054 525 A1, for example. An overrun air recirculation valve constitutes a connection between the pressure side and the suction side of the compressor. As a result of a temporary opening of the overrun air recirculation valve to the suction side of the compressor, the pressure side of the compressor can be unloaded as a result. The air is then circulated.

In this arrangement, however, it is a problem that the enthalpy of the circulated air is not utilized since the work produced by the compressor for circulation of the air is produced purely as a power loss. Furthermore, the use of an overrun air recirculation valve for one thing is cost intensive. For another thing, the overrun air recirculation valve is to be taken into account in the packaging of the exhaust gas turbocharger and increases its complexity and likelihood of failure. Furthermore, additional installation space is necessary for the overrun air recirculation valve, which is often not available, especially in the case of small engines.

Against this background, the present invention is based on the object of providing an improved internal combustion engine having an exhaust gas turbocharger.

BRIEF SUMMARY OF THE INVENTION

This object is achieved according to the invention by means of a method and/or by means of an internal combustion engine.

Accordingly, provision is made for:

a method for operating an internal combustion engine having an exhaust gas turbocharger during a load change of the internal combustion engine, with the method steps: initiation of a closing process of a throttle valve of the internal combustion engine, arranged in an induction tract of said internal combustion engine, as a function of an air pressure which is present upstream of the throttle valve in such a way that the air pressure always falls short of a surge limit of a compressor, arranged in the induction tract, of the exhaust gas turbocharger; and a staged reduction of torque of the internal combustion engine by means of shutting off fuel injections at prespecified cylinders of the internal combustion engine.

An internal combustion engine, especially for a motor vehicle, having an exhaust gas turbocharger, with a closing device for initiating a closing process of a throttle valve of the internal combustion engine, arranged in an induction tract of said internal combustion engine, during a load change of the internal combustion engine as a function of an air pressure which is present upstream of the throttle valve in such a way that the air pressure always falls short of a surge limit of a compressor, arranged in the induction tract, of the exhaust gas turbocharger, and with a fuel injection device for staged reduction of torque of the internal combustion engine by means of shutting off fuel injections at prespecified cylinders of the internal combustion engine.

The idea upon which the present invention is based entails gradually closing the throttle valve, located in the induction tract, during a load change of the internal combustion engine as a function of an air pressure which is present upstream of the throttle valve, wherein during the gradual closing of the throttle valve the surge limit of the compressor of the exhaust gas turbocharger is always fallen short of. The torque of the internal combustion engine is reduced in stages in this case by means of shutting off fuel injections at prespecified cylinders of the internal combustion engine.

In contrast to the solution approaches described in the introduction, a reduction of the engine torque during a simultaneous falling short of the surge limit of the compressor is consequently achieved without the use of an overrun air recirculation valve. In comparison to an internal combustion engine having an exhaust gas turbocharger and overrun air recirculation valve, it is therefore possible to provide a less complex, installation space-reduced and, moreover, more cost-effective internal combustion engine having an exhaust gas turbocharger.

Advantageous embodiments and developments of the present invention are to be gathered from the further dependent claims and from the description in conjunction with the figures of the drawing.

In a preferred embodiment of the present invention, the staged reduction of the torque is carried out by means of shutting off fuel injections at a variable number of prespecified cylinders.

In a typical embodiment of the present invention, the fuel injection on the internal combustion engine, after a prespecified time, after a time point of the initiation of the load change of the internal combustion engine, is completely stopped for achieving an overrun fuel cut-off of the internal combustion engine.

In an especially preferred embodiment of the present invention, the throttle valve is completely closed during the initiation of the closing process.

In a further preferred embodiment of the present invention, the load change is a sudden negative load variation.

In a preferred embodiment of the present invention, provision is made for a closed-loop control circuit which features a charge-air pressure sensor for determining the air pressure, wherein the closed-loop control circuit is designed in such a way that upon initiation of the closing process of the throttle valve various frictional conditions in the exhaust gas turbocharger, especially on account of variable oil temperatures, are taken into consideration.

In an also preferred embodiment of the present invention, an engine control unit of the internal combustion engine controls the initiation of the closing process of the throttle valve of the internal combustion engine and the staged reduction of the torque of the internal combustion engine.

In a further preferred embodiment of the present invention, provision is made for an engine control unit which controls the function of the closing device and of the fuel injection device.

In a preferred embodiment of the present invention, the fuel injection device features injection valves.

In an also preferred embodiment of the present invention, the fuel injection device is designed for the complete stopping of fuel injection on the internal combustion engine.

In a further preferred embodiment of the present invention, a charge-air pressure sensor, arranged in the induction tract of the internal combustion engine upstream of the throttle valve in the flow direction, is provided for determining the air pressure.

In an also preferred embodiment of the present invention, the closing device is designed as a throttle-valve actuator, especially as an electric throttle-valve actuator.

The above embodiments, if practical, can be combined with each other in any way.

BRIEF DESCRIPTION OF THE SEVERAL VIEWS OF THE DRAWING

The present invention is subsequently explained in more detail based on the exemplary embodiments which are represented in the schematic figures. In this case, in the drawing.

DESCRIPTION OF THE INVENTION

Figure 1:
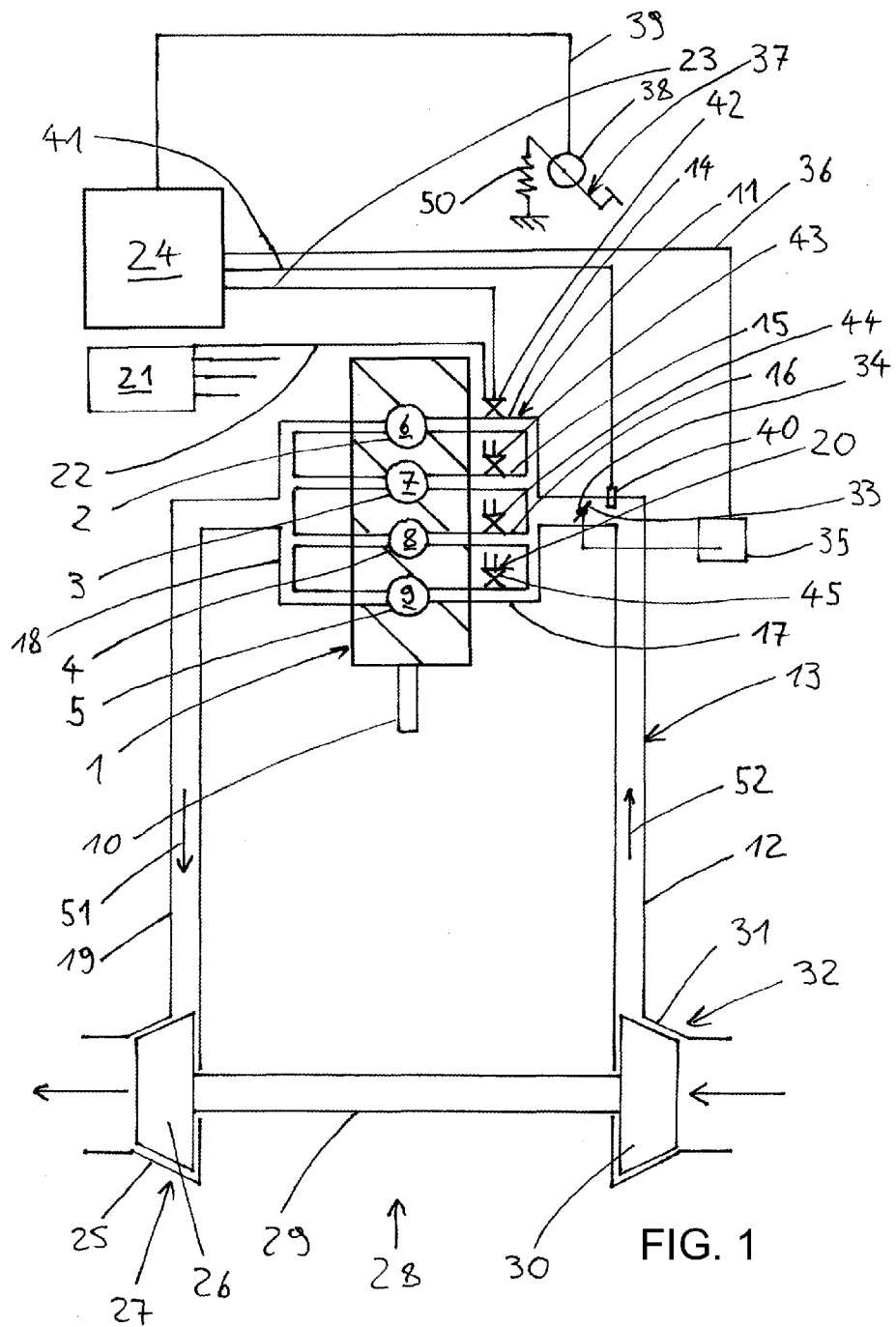
FIG. 1 shows a top view of a preferred embodiment of an internal combustion engine having an exhaust gas turbocharger.

In the figures of the drawing, like components, elements and features have been provided with the same designations, unless stated to the contrary.

FIG. 1 illustrates a top view of a preferred embodiment of an internal combustion engine having an exhaust gas turbocharger.

An internal combustion engine 1 has, for example, a plurality of cylinders 2-5 and pistons 6-9 which are arranged in an axially movable manner in the cylinders 2-5. The internal combustion engine 1 is preferably designed as an Otto engine 1. The number of cylinders 2-5 or the number of pistons 6-9 is optional and may be more than or less than four. The internal combustion engine 1 also has a crankshaft 10 which is functionally connected to the pistons 6-9 via piston rods, which are not shown. The internal combustion engine 1 also has an induction manifold 11 which fluidically connects combustion chambers of the internal combustion engine 1, formed by the cylinders 2-5, to an induction pipe 12. The induction manifold 11 and the induction pipe 12 form an induction tract 13 of the internal combustion engine 1. The induction manifold 11 has a number of induction pipes 14-17 corresponding to the number of cylinders 2-5, wherein each induction pipe 14-17 is associated with a cylinder 2-5 in each case. The induction pipes 14-17 can be connected to the corresponding cylinders 2-5 of the internal combustion engine 1, or disconnected from these, by means of inlet valves, which are not shown, which are designed as poppet valves, for example, which are mechanically operated by means of a camshaft of the internal combustion engine 1. The inlet valves are preferably arranged in an engine block of the internal combustion engine 1. A plurality of inlet valves, for example, are provided per cylinder 2-5. The internal combustion engine 1 also has an exhaust manifold 18 which connects the cylinders 2-5 of the internal combustion engine 1 to an exhaust pipe 19 of the internal combustion engine 1. Each cylinder 2-5 can be fluidically connected to the exhaust manifold 18, or disconnected from this, in each case via at least one exhaust valve, which is not shown, which is also designed as a poppet valve, for example, which is operated by the camshaft and preferably arranged in the engine block.

The internal combustion engine 1 also has a fuel injection device 20. The fuel injection device 20 comprises injection valves 42-45, for example, wherein one injection valve 42-45 is associated with each cylinder 2-5. The injection valves 42-45 are designed as electrically operable magnetic valves 42-45, for example. The fuel injection device 20 also has at least one fuel pump, for example. The fuel pump can serve for the common pressurization of all the injection valves 42-45 or a separate injection pump is associated with each injection valve 42-45 and is preferably integrated into the respective injection valve 42-45. Fuel is fed to the injection valves 42-45 from a fuel tank 21 via fuel lines. For simplified representation, only one fuel line 22 for supplying the injection valve 42 is illustrated in FIG. 1. The fuel valves 42-45 are preferably arranged on the internal combustion engine 1 in such a way that the fuel injection takes place directly into the cylinders 2-5 of the internal combustion engine 1, that is to say in the form of a so-called direct injection. Alternatively, these injection valves 42-45, as shown in FIG. 1, are arranged for injecting into the corresponding induction pipes 14-17 of the induction tract 13 of the internal combustion engine 1. The injection valves 42-45 are functionally connected in each case to an engine control unit 24 of the internal combustion engine 1 by means of a data line, of which only one data line 23 is shown for simplification.

The exhaust pipe 19 of the internal combustion engine 1 is fluidically connected to a turbine wheel 26, arranged in a turbine housing 25, of a turbine 27 of an exhaust gas turbocharger 28. The turbine wheel 26 is connected in a rotation-resistant manner to an impeller 30 of the exhaust gas turbocharger 28 by means of a rotor shaft 29 of said exhaust gas turbocharger 28. The impeller 30 is arranged in a compressor housing 31 of a compressor 32 of the exhaust gas turbocharger 28. The impeller 30 of the exhaust gas turbocharger 28 is fluidically connected to the cylinders 2-5 of the internal combustion engine 1 via the induction tract 13.

A throttle valve 33 is arranged in the induction tract 13. The throttle valve 33 is preferably arranged between the compressor 32 and the induction manifold 11 of the internal combustion engine 1, which branches in a fan-like manner, for example. The throttle valve 33 is arranged just upstream of the induction manifold 11 in the flow direction, for example. The throttle valve 33 has a cylindrical shape as a circular disk, for example, which is rotatably mounted perpendicularly to a rotational axis 34 of the throttle valve 33. The throttle valve 33 is preferably designed in such a way that this enables complete closing of a cross section of the induction tract 13. The throttle valve 33 is operated by means of a closing device 35. The closing device 35 is designed as a throttle-valve actuator 35, for example, especially as an electric throttle-valve actuator 35. The throttle-valve actuator 35 is functionally connected to the throttle valve 33 via an actuating arm, for example. Alternatively, the throttle-valve actuator 35 can be designed in such a way that this directly deflects the throttle valve 33. The throttle valve actuator 35 is designed as a stepper motor, for example. The throttle valve actuator 35 is also preferably designed in such a way that it senses an angular position and therefore a current opening degree of the throttle valve 33. The throttle valve actuator 35 is functionally connected to the engine control unit 24 of the internal combustion engine 1 via a data line 36.

The internal combustion engine 1 also has a pressure sensor 40 which is arranged in the induction tract 13 and is preferably designed as a charge-air sensor 40. The pressure sensor 40 is arranged between the throttle valve 33 and the compressor 32, preferably just upstream of the throttle valve 33 in the flow direction. The pressure sensor 40 is provided for measuring a charge-air pressure just upstream of the throttle valve 33.

The pressure sensor 40 is functionally connected to the engine control unit 24 by means of a data line 41.

Provision is also made for an accelerator pedal 37, especially a so-called electronic accelerator pedal 37. The accelerator pedal 37 preferably has a pedal sensor 38 which is suitable for determining an angular position of the accelerator pedal 37, for example. The pedal sensor 38 is functionally connected to the engine control unit 24 of the internal combustion engine 1 via a data line 39. The accelerator pedal 37 preferably has a spring device 50 which brings the accelerator pedal 37 in a non-operated state into an initial position.

During operation of the internal combustion engine 1 having the exhaust gas turbocharger 28, the internal combustion engine 1 supplies exhaust gas to the turbine wheel 26 via the exhaust pipe 19, as is illustrated by means of the arrow 51. By means of the turbine wheel 26, the enthalpy of the exhaust gas is lowered and the kinetic and thermal energy of the exhaust gas is converted into rotational energy. The rotational energy is transmitted to the impeller 30 via the rotor shaft 29. The impeller 30 inducts fresh air, compresses this and feeds the compressed fresh air—represented by means of the arrow 52—to the internal combustion engine 1 via the induction tract 13.

Due to the fact that more oxygen is present in the compressed air volume per volumetric unit, more fuel per air volumetric unit can be combusted in the internal combustion engine 1, as a result of which the power yield of the internal combustion engine 1 is increased. By means of the supplied fresh air, fuel is combusted in the cylinders 2-5 of the internal combustion engine 1 and the expansion of the gas mixture resulting therefrom is converted into kinetic energy of the pistons 6-9. Since the pistons 6-9 are functionally connected to the crankshaft 10 of the internal combustion engine 1 via the piston rods, the kinetic energy of the pistons 6-9 is converted into rotational energy of the crankshaft 10. The crankshaft 10 can transmit torque to a drive train of a motor vehicle. In order to regulate the delivered power of the internal combustion engine 1, the supplied quantity of air and fuel is controlled. The air quantity is controlled via the position of the throttle valve 33 in the induction tract 13, for example. As a function of the fresh air quantity which is fed to the internal combustion engine 1 and determined by means of the throttle valve 33, a specific quantity of fuel is fed to the cylinders 2-5 of the internal combustion engine 1. Injection time points and injection quantities of the fuel which is injected by means of the injection valves 42-45 are controlled in proportion to the existing quantity of fresh air, for example, based on a stored engine map of the engine control unit 24. The injection valve 42 is thus operated by means of the data line 23 from the engine control unit 24, for example.

The angular position of the throttle valve 33 is altered by a user by a corresponding operation of the accelerator pedal 37. The position of the accelerator pedal 37, especially its angular position, is sensed by means of the pedal sensor 38 and transmitted via the data line 39 to the engine control unit 24, wherein the engine control unit 24, via the data line 36, gives the corresponding control demand for the positioning of the throttle valve 33 to the throttle-valve actuator 35 of said throttle valve 33. Furthermore, an angular position of the throttle valve 33 is sensed by means of the throttle-valve actuator 35 and fed to the engine control unit 24 by means of the data line 36.

The function of the internal combustion engine 1 during a load change of said internal combustion engine 1, especially during a sudden negative power variation, is explained below. There is a load change during an overrun condition of the internal combustion engine 1, for example, if the user executes a gear change, for example, and to this end does not operate the accelerator pedal 37, as a result of which this is brought into the initial position by means of the spring device 50. The position of the accelerator pedal 37 is sensed by means of the pedal sensor 38 and fed to the engine control unit 24 by means of the data line 39. After identifying the overrun condition of the internal combustion engine 1 by means of the engine control unit 24, this initiates a pressure-controlled closing process of the throttle valve 33. To this end, a closed-loop control circuit is designed with the pressure sensor 40, for example, making it possible to control the closing of the throttle valve 33 so that an air pressure downstream of the compressor 32 or upstream of the throttle valve 33 always falls short of a surge limit of the compressor during the closing process 32. The closed-loop control circuit is preferably designed in such a way that upon initiation of the closing process of the throttle valve 33 various frictional conditions in the exhaust gas turbocharger 28, especially on account of variable oil temperatures, are taken into consideration. In parallel with this, or with a time stagger in relation thereto, the engine control unit 24 begins a staged reduction of the torque of the internal combustion engine 1. For this, fuel injections of the injection valves 42-45 into the cylinders 2-5 or into the induction pipes 14-17 are shut off by the engine control unit 24. A staged reduction of the torque of the internal combustion engine 1 is achieved in this case, for example, by fuel no longer being injected first of all into cylinder 2, followed by fuel no longer being injected into cylinders 2 and 3, and continuing by fuel no longer being injected into cylinders 2, 3 and 4. The torque of the internal combustion engine 1 can therefore be controlled in four steps, for example, by injection being carried out for a combustion cycle in question of the internal combustion engine either into all the cylinders 2-5 or only into one cylinder of cylinders 2-5. After a specified time, for example two seconds after identifying the load change of the internal combustion engine 1, the engine control unit 24 preferably completely stops the fuel injection into the internal combustion engine 1, wherein the throttle valve 33 is then also completely closed corresponding to the prevailing pressure in the induction tract 13. The internal combustion engine 1 is then in a state of overrun fuel cut-off.

It is therefore possible to reduce the air pressure upstream of the throttle valve 33 by means of a controlled closing of the throttle valve 33 and by means of torque control of the internal combustion engine 1 by shutting off injections. The surge limit of the compressor 32 is always fallen short of in the process.

Figure 2:
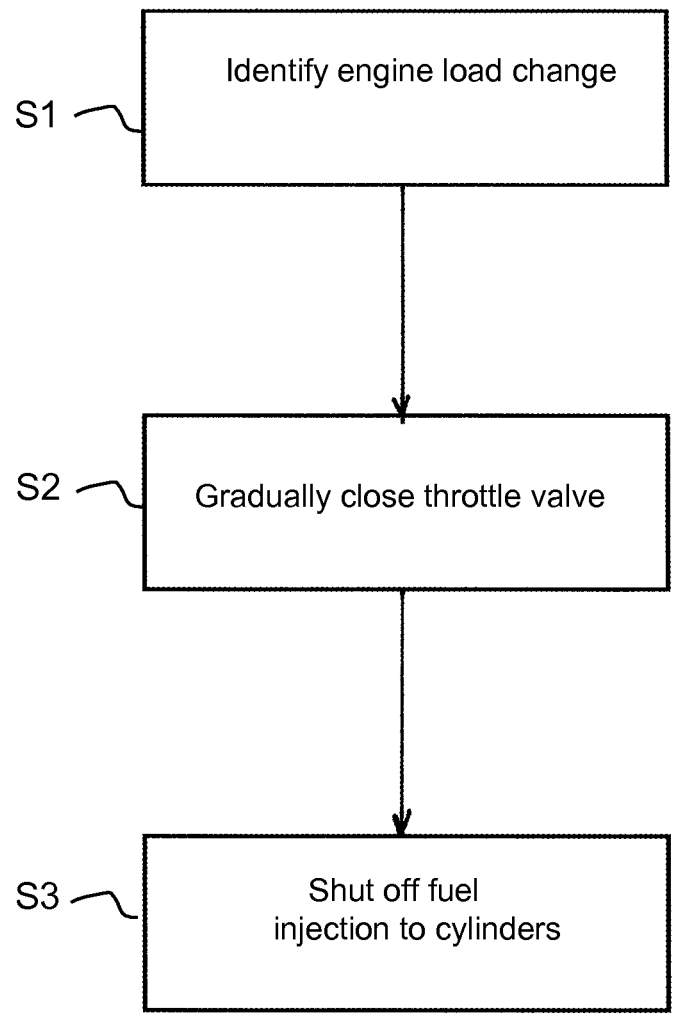
FIG. 2 shows a schematic representation of a method for operating an internal combustion engine having an exhaust gas turbocharger during a load change of the internal combustion engine.

FIG. 2 shows a schematic representation of a method for operating an internal combustion engine having an exhaust gas turbocharger during a load change of the internal combustion engine.

After identifying a load change of the internal combustion engine 1 in a preliminary method step S1 by means of the engine control unit 24, in a method step S2 a gradual pressure-controlled closing process is initiated in the throttle valve 33, arranged in the induction tract 13 of the internal combustion engine 1, as a function of an air pressure which is present upstream of the throttle valve 33, in such a way that the air pressure always falls short of a surge limit of the compressor 32, arranged in the induction tract 13, of the exhaust gas turbocharger 28. In a further method step S3, which preferably begins simultaneously with the method step S2, or alternatively with a time shift in relation thereto, torque of the internal combustion engine 1 is initiated by means of shutting off fuel injections at prespecified cylinders 2-5 of the internal combustion engine 1.

By means of the method according to the invention, it is possible to reduce the air pressure upstream of the throttle valve 33 by means of pressure-controlled closing of the throttle valve 33 and by means of a staged torque controlling of the internal combustion engine 1 by means of shutting off fuel injections.

As a result of this, in comparison to known solutions, the same torque characteristic on the crankshaft of the internal combustion engine is achieved, which is also achieved during a fast closing of the throttle valve. In contrast to known solutions, it is possible, however, to reliably prevent surging of the compressor without the use of a space and cost intensive overrun air recirculation valve. As a result of this, the complexity of the internal combustion engine having the exhaust gas turbocharger is considerably reduced.

The disclosed internal combustion engine and the disclosed method can be particularly advantageously used in the field of motor vehicles and in this case preferably in private vehicles, for example with Otto engines, but when required can also be used with any other turbocharger applications.

The invention claimed is:

1. A method for operating an internal combustion engine, having an exhaust gas turbocharger, during a load change of the internal combustion engine, the method comprising the following steps:
    providing the internal combustion engine with cylinders, an induction tract communicating with the cylinders and a throttle valve disposed in the induction tract;
    providing the exhaust gas turbocharger with a compressor disposed in the induction tract;
    initiating a closing process of gradually closing the throttle valve as a function of an air pressure present upstream of the throttle valve, causing the air pressure to always falls short of a surge limit of the compressor; and
    reducing a torque of the internal combustion engine in stages by shutting off fuel injections at predetermined cylinders.

2. The method according to claim 1, which further comprises carrying out the staged reduction of the torque by shutting off fuel injections at a variable number of predetermined cylinders.

3. The method according to claim 1, which further comprises completely stopping the fuel injection of the internal combustion engine, after a predetermined time, after a time point of an initiation of the load change of the internal combustion engine and achieving an overrun fuel cut-off of the internal combustion engine.

4. The method according to claim 3, which further comprises completely closing the throttle valve during the initiation of the closing process.

5. The method according to claim 1, wherein the load change is a sudden negative load variation.

6. The method according to claim 1, which further comprises:
    providing a closed-loop control circuit having a charge-air pressure sensor determining the air pressure; and
    taking various frictional conditions in the exhaust gas turbocharger into consideration with the closed-loop control circuit upon initiation of the closing process of the throttle valve.

7. The method according to claim 6, wherein the frictional conditions include variable oil temperatures.

8. The method according to claim 1, which further comprises providing an engine control unit of the internal combustion engine controlling the initiation of the closing process of the throttle valve and the staged reduction of the torque of the internal combustion engine.

9. An internal combustion engine, comprising:
    cylinders;
    an induction tract communicating with said cylinders;
    a throttle valve disposed in said induction tract;
    an exhaust gas turbocharger having a compressor disposed in said induction tract, said compressor having a surge limit;
    a closing device configured to initiate a closing process during a load change of the internal combustion engine in which the throttle valve is gradually closed as a function of an air pressure present upstream of said throttle valve causing the air pressure to always fall short of said surge limit of said compressor; and
    a fuel injection device configured to reduce a torque of the internal combustion engine in stages by shutting off fuel injections at predetermined cylinders.

10. The internal combustion engine according to claim 9, which further comprises an engine control unit configured to control functioning of said closing device and of said fuel injection device.

11. The internal combustion engine according to claim 9, wherein said fuel injection device has injection valves.

12. The internal combustion engine according to claim 9, wherein said fuel injection device is configured to completely stop fuel injection of the internal combustion engine.

13. The internal combustion engine according to claim 9, which further comprises a charge-air pressure sensor disposed in said induction tract upstream of said throttle valve in air flow direction, said pressure sensor configured to determine air pressure.

14. The internal combustion engine according to claim 9, wherein said closing device is constructed as a throttle-valve actuator.

15. The internal combustion engine according to claim 9, wherein said closing device is constructed as an electric throttle-valve actuator.

16. The internal combustion engine according to claim 9, wherein the internal combustion engine is a motor vehicle internal combustion engine.

17. The internal combustion engine according to claim 10, wherein said engine control unit is configured to completely close the throttle valve during the initiation of the closing process.

18. The internal combustion engine according to claim 9, wherein said engine control unit is configured to move the throttle valve over time during the closing process towards a closed position as a function of an air pressure present upstream of the throttle valve.

19. The method according to claim 1, wherein during the closing process, the throttle valve is moved over time towards a closed position as a function of an air pressure present upstream of the throttle valve.

* * * * *